(12) United States Patent
Zhu et al.

(10) Patent No.: US 11,614,151 B2
(45) Date of Patent: Mar. 28, 2023

(54) POWER SPLIT AND POWER CONVERGENCE COMBINED HYDRO-MECHANICAL HYBRID TRANSMISSION DEVICE

(71) Applicant: JIANGSU UNIVERSITY, Zhenjiang (CN)

(72) Inventors: Zhen Zhu, Zhenjiang (CN); Yingfeng Cai, Zhenjiang (CN); Long Chen, Zhenjiang (CN); Xiang Tian, Zhenjiang (CN); Juncheng Wang, Zhenjiang (CN); Changgao Xia, Zhenjiang (CN); Jiangyi Han, Zhenjiang (CN); Feng Wang, Zhenjiang (CN); Xing Xu, Zhenjiang (CN); Dehua Shi, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/623,932

(22) PCT Filed: Aug. 4, 2020

(86) PCT No.: PCT/CN2020/106687
§ 371 (c)(1),
(2) Date: Dec. 30, 2021

(87) PCT Pub. No.: WO2022/016607
PCT Pub. Date: Jan. 27, 2022

(65) Prior Publication Data
US 2022/0373072 A1    Nov. 24, 2022

(30) Foreign Application Priority Data

Jul. 20, 2020 (CN) .......................... 202010697153.1

(51) Int. Cl.
*F16H 47/04* (2006.01)
*F16H 61/00* (2006.01)

(52) U.S. Cl.
CPC ............. *F16H 47/04* (2013.01); *F16H 61/00* (2013.01)

(58) Field of Classification Search
CPC ...... F16H 47/04; F16H 61/00; F16H 37/0833; F16H 61/0003; F16H 2200/2012; F16H 2200/2053
See application file for complete search history.

(56) References Cited

FOREIGN PATENT DOCUMENTS

| CN | 107859723 A | * | 3/2018 | ............ F16H 47/04 |
| CN | 110822053 A |   | 2/2020 |                        |

(Continued)

*Primary Examiner* — Justin Holmes
(74) *Attorney, Agent, or Firm* — Bayramoglu Law Offices LLC (57) ABSTRACT

A power split and power convergence combined hydro-mechanical hybrid transmission device includes an input member, a power split mechanism, a mechanical transmission mechanism, a power convergence mechanism, an output member, a hydraulic transmission mechanism, a clutch assembly, and a brake assembly. The input member is connected to the power split mechanism, the power convergence mechanism is connected to the output member, and the clutch assembly connects an output end of the power split mechanism to an input end of the mechanical transmission mechanism and an input end of the hydraulic transmission mechanism and connects an input end of the power convergence mechanism to an output end of the mechanical transmission mechanism and an output end of the hydraulic transmission mechanism. The clutch assembly and the brake assembly provide a continuous transmission ratio between the input member and the output member.

8 Claims, 9 Drawing Sheets

(56) References Cited

FOREIGN PATENT DOCUMENTS

| | | | |
|---|---|---|---|
| CN | 110953318 | A | 4/2020 |
| DE | 3147447 | A1 * | 6/1983 |
| JP | 2008082540 | A | 4/2008 |
| WO | WO-8909353 | A1 * | 10/1989 |

\* cited by examiner

Two types of hydraulic transmission

FIG. 14A

Switching from hydraulic transmission to power-split hydro-mechanical transmission

FIG. 14B

Switching from hydraulic transmission to power-convergence hydro-mechanical transmission

FIG. 14C

Switching from reverse hydraulic transmission to hydro-mechanical transmission

FIG. 14D

POWER SPLIT AND POWER CONVERGENCE COMBINED HYDRO-MECHANICAL HYBRID TRANSMISSION DEVICE

CROSS REFERENCE TO THE RELATED APPLICATIONS

This application is the national phase entry of International Application No. PCT/CN20201106687, filed on Aug. 4, 2020, which is based upon and claims priority to Chinese Patent Application No. 202010697153.1, filed on Jul. 20, 2020, the entire contents of which are incorporated herein by reference.

TECHNICAL FIELD

The present invention relates to the field of gearboxes, and in particular, to a power split and power convergence combined hydro-mechanical hybrid transmission device.

BACKGROUND

The hydro-mechanical hybrid transmission devices each formed by parallel connection of the hydraulic transmission mechanism and the mechanical transmission mechanism are mainly divided into two types: power split and power convergence. Generally, the power-split hydro-mechanical hybrid transmission mechanism adopts a planetary gear mechanism for power split at the input end and features a wide speed regulation range; and the power-convergence hydro-mechanical hybrid transmission mechanism adopts a planetary gear mechanism for power convergence at the output end and features high controllability. The multi-mode hydro-mechanical hybrid transmission device that integrates hydraulic transmission, hydro-mechanical transmission, and mechanical transmission can only meet the requirements of vehicle startup, operation, and transfer to a certain extent and still has difficulty in meeting the requirements of fine operation.

SUMMARY

To eliminate the defects in the prior art, the present invention provides a power split and power convergence combined hydro-mechanical hybrid transmission device, which is a multi-mode hydro-mechanical hybrid transmission device that integrates hydraulic transmission, power-split hydro-mechanical transmission, power-convergence hydro-mechanical transmission, and mechanical transmission to meet the requirements of fine operation in multiple working conditions.

The present invention achieves the above objective through the following technical solution.

A power split and power convergence combined hydro-mechanical hybrid transmission device includes an input member, a power split mechanism, a mechanical transmission mechanism, a power convergence mechanism, an output member, a hydraulic transmission mechanism, a clutch assembly, and a brake assembly, wherein the input member is connected to the power split mechanism, the power convergence mechanism is connected to the output member, and the clutch assembly connects an output end of the power split mechanism to an input end of the mechanical transmission mechanism and an input end of the hydraulic transmission mechanism and connects an input end of the power convergence mechanism to an output end of the mechanical transmission mechanism and an output end of the hydraulic transmission mechanism; the clutch assembly and the brake assembly provide a continuous transmission ratio between the input member and the output member.

Further, transmission modes including hydraulic transmission, power-split hydro-mechanical transmission, power-convergence hydro-mechanical transmission, and mechanical transmission are provided between the input member and the output member by adjusting a displacement ratio of the hydraulic transmission mechanism and selectively controlling engagement of the clutch assembly and the brake assembly.

Further, the mechanical transmission mechanism includes a mechanical transmission mechanism input shaft, a front planetary gear mechanism, and a rear planetary gear mechanism, wherein a sun gear of the rear planetary gear mechanism and a ring gear of the front planetary gear mechanism are both connected to the mechanical transmission mechanism input shaft; a planet carrier of the front planetary gear mechanism is connected to a planet carrier of the rear planetary gear mechanism;

the power split mechanism includes a power split planetary gear mechanism, wherein a ring gear of the power split planetary gear mechanism is connected to the input member, a sun gear of the power split planetary gear mechanism is connected to the input end of the hydraulic transmission mechanism, and a planet carrier of the power split planetary gear mechanism is connected to the mechanical transmission mechanism input shaft;

the power convergence mechanism includes a power convergence planetary gear mechanism, wherein a ring gear of the rear planetary gear mechanism is connected to a ring gear of the power convergence planetary gear mechanism, a planet carrier of the power convergence planetary gear mechanism is connected to the output member, and a sun gear of the power convergence planetary gear mechanism is connected to the output end of the hydraulic transmission mechanism.

Further, the clutch assembly includes a clutch $C_2$, a clutch $C_4$, a clutch $C_5$, and a clutch $C_6$, wherein the clutch $C_2$ selectively connects the ring gear of the power split planetary gear mechanism to the planet carrier of the power split planetary gear mechanism to achieve synchronous rotation; the clutch $C_4$ selectively connects the ring gear of the power convergence planetary gear mechanism to the planet carrier of the power convergence planetary gear mechanism to achieve synchronous rotation; the clutch $C_5$ selectively connects the sun gear of the power split planetary gear mechanism to the input end of the hydraulic transmission mechanism to achieve synchronous rotation; the clutch $C_6$ selectively connects the output end of the hydraulic transmission mechanism to the sun gear of the power convergence planetary gear mechanism to achieve synchronous rotation; the brake assembly includes a brake $B_1$, a brake $B_2$, and a brake $B_3$, wherein the brake $B_1$ is used for selectively connecting the planet carrier of the front planetary gear mechanism to a fixed member; the brake $B_2$ is used for selectively connecting a sun gear of the front planetary gear mechanism to a fixed member; the brake $B_3$ is used for selectively connecting the ring gear of the power convergence planetary gear mechanism to a fixed member; continuous forward or reverse hydraulic transmission is provided between the input member and the output member by adjusting the displacement ratio of the hydraulic transmission mechanism and selectively controlling engagement of the clutch $C_2$, the clutch $C_4$, the clutch $C_5$, the clutch $C_6$, the brake $B_1$, the brake $B_2$, and the brake $B_3$.

Further, the clutch $C_5$, the clutch $C_6$, the brake $B_1$, and the brake $B_2$ are engaged to provide reverse hydraulic transmission between the input member and the output member;

the clutch $C_5$, the clutch $C_6$, the clutch $C_2$, and the brake $B_3$ are engaged and the clutch $C_5$, the clutch $C_6$, the clutch $C_2$, and the clutch $C_4$ are engaged to provide different forward hydraulic transmissions between the input member and the output member.

Further, the clutch assembly further includes a clutch $C_3$, wherein the clutch $C_3$ selectively connects the ring gear of the front planetary gear mechanism to the sun gear of the front planetary gear mechanism to achieve synchronous rotation;

the clutch $C_4$, the clutch $C_5$, the clutch $C_6$, and the brake $B_1$ are engaged to provide reverse power-split hydro-mechanical transmission between the input member and the output member;

the clutch $C_4$, the clutch $C_5$, the clutch $C_6$, and the brake $B_2$ are engaged and the clutch $C_3$, the clutch $C_4$, the clutch $C_5$, and the clutch $C_6$ are engaged to provide different forward power-split hydro-mechanical transmissions between the input member and the output member.

Further, the clutch $C_2$, the clutch $C_5$, the clutch $C_6$, and the brake $B_1$ are engaged to provide reverse power-convergence hydro-mechanical transmission between the input member and the output member;

the clutch $C_2$, the clutch $C_5$, the clutch $C_6$, and the brake $B_2$ are engaged and the clutch $C_2$, the clutch $C_3$, the clutch $C_5$, and the clutch $C_6$ are engaged to provide different forward power-convergence hydro-mechanical transmissions between the input member and the output member.

Further, the clutch $C_2$, the clutch $C_4$, and the brake $B_1$ are engaged to provide reverse mechanical transmission between the input member and the output member;

the clutch $C_2$, the clutch $C_4$, and the brake $B_2$ are engaged and the clutch $C_2$, the clutch $C_3$, and the clutch $C_4$ are engaged to provide different forward mechanical transmissions between the input member and the output member.

Further, stepless speed regulation between forward hydraulic transmission and forward power-split hydro-mechanical transmission and stepless speed regulation between forward hydraulic transmission and forward power-convergence hydro-mechanical transmission are provided by adjusting the displacement ratio of the hydraulic transmission mechanism and selectively controlling engagement of the clutch $C_1$, the clutch $C_2$, the clutch $C_3$, the clutch $C_4$, the clutch $C_5$, the clutch $C_6$, the brake $B_1$, and the brake $B_2$.

Further, stepless speed regulation between reverse hydraulic transmission and reverse power-split hydro-mechanical transmission and stepless speed regulation between reverse hydraulic transmission and reverse power-convergence hydro-mechanical transmission are provided by adjusting the displacement ratio of the hydraulic transmission mechanism and selectively controlling engagement of the clutch $C_1$, the clutch $C_2$, the clutch $C_3$, the clutch $C_4$, the clutch $C_5$, the clutch $C_6$, the brake $B_1$, and the brake $B_2$.

The present invention has the following beneficial effects:

1. The power split and power convergence combined hydro-mechanical hybrid transmission device of the present invention is a hydro-mechanical hybrid transmission device that integrates hydraulic transmission, hydro-mechanical transmission, and mechanical transmission.

2. According to the power split and power convergence combined hydro-mechanical hybrid transmission device of the present invention, power-split hydro-mechanical transmission and power-convergence hydro-mechanical transmission in hydro-mechanical transmission meet the requirements of fine operation.

3. According to the power split and power convergence combined hydro-mechanical hybrid transmission device of the present invention, a unidirectional variable displacement pump-controlled quantitative motor mechanism is combined with the transmission device structure to implement forward and reverse transmission of the mechanism.

4. According to the power split and power convergence combined hydro-mechanical hybrid transmission device of the present invention, a few clutch assemblies and brake assemblies are adopted to implement switching from hydraulic transmission to hydro-mechanical transmission.

1. input shaft; 2. main clutch $C_1$; 3. power split mechanism; 31. power split mechanism input shaft; 32. clutch $C_2$; 33. power split mechanism ring gear; 34. power split mechanism planet carrier; 35. power split mechanism sun gear; 4. mechanical transmission mechanism; 41. mechanical transmission mechanism input shaft; 42. clutch $C_3$; 43. brake $B_2$; 44. front planetary gear mechanism sun gear; 45. front planetary gear mechanism planet carrier; 46. brake $B_1$; 47. rear planetary gear mechanism planet carrier; 48. front planetary gear mechanism ring gear; 49. rear planetary gear mechanism ring gear; 410. rear planetary gear mechanism sun gear; 411. mechanical transmission mechanism output shaft; 5, power convergence mechanism; 51. brake $B_3$; 52. power convergence mechanism ring gear; 53. power convergence mechanism planet carrier; 54, power convergence mechanism sun gear; 55. clutch $C_4$; 6. output shaft; 7. hydraulic transmission mechanism; 71. clutch $C_5$; 72. hydraulic transmission input gear pair; 73. variable displacement pump; 74. hydraulic pipe; 75. quantitative motor; 76. hydraulic transmission output gear pair; 77. clutch $C_6$.

DETAILED DESCRIPTION OF THE EMBODIMENTS

The present invention is further described below with reference to the accompanying drawings and specific embodiments, but the protection scope of the present invention is not limited thereto.

Figure 1:
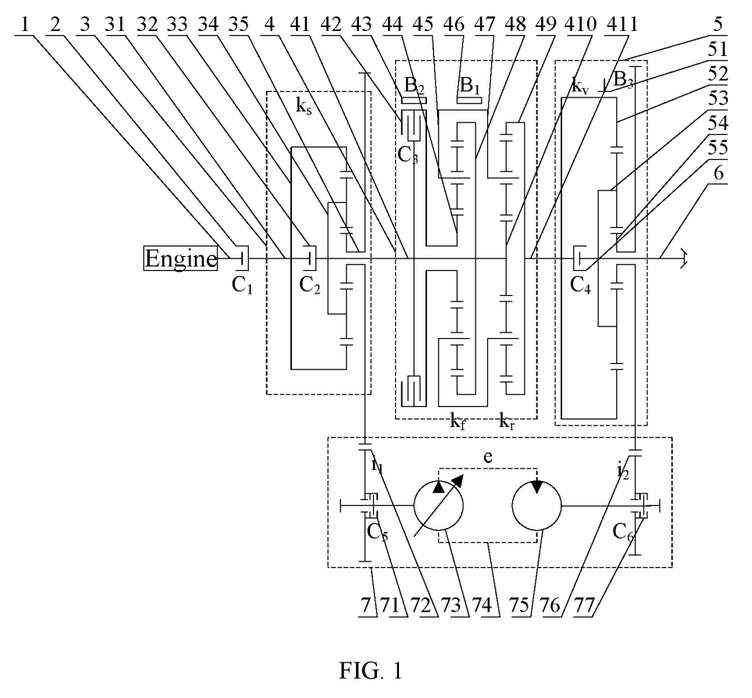
FIG. 1 is a schematic diagram of a power split and power convergence combined hydro-mechanical hybrid transmission device of the present invention.

As shown in FIG. 1, the power split and power convergence combined hydro mechanical hybrid transmission device of the present invention includes a main clutch $C_1$ 2, an input shaft 1, a power split mechanism 3, a mechanical transmission mechanism 4, a power convergence mechanism 5, an output shaft 6, and a hydraulic transmission mechanism 7.

The power split mechanism 3 includes a power split mechanism input shaft 31, a clutch $C_2$ 32, a power split mechanism ring gear 33, a power split mechanism planet carrier 34, and a power split mechanism sun gear 35. The power split mechanism ring gear 33 and the power split mechanism input shaft 31 are fixedly connected and are connected to the input shaft 1 through the main clutch $C_1$ 2. The clutch $C_2$ 32 is used for connecting the power split mechanism ring gear 33 and the power split mechanism planet carrier 34. The power split mechanism sun gear 35 is connected to an input end of the hydraulic transmission mechanism 7. The power split mechanism planet carrier 34 is connected to the mechanical transmission mechanism 4.

The mechanical transmission mechanism 4 includes a mechanical transmission mechanism input shaft 41, a clutch $C_3$ 42, a brake $B_2$ 43, a front planetary gear mechanism sun gear 44, a front planetary gear mechanism planet carrier 45, a brake $B_1$ 46, a rear planetary gear mechanism planet carrier 47, a front planetary gear mechanism ring gear 48, a rear planetary gear mechanism ring gear 49, a rear planetary gear mechanism sun gear 410, and a mechanical transmission mechanism output shaft 411. The rear planetary gear mechanism sun gear 410, the front planetary gear mechanism ring gear 48, and the power split mechanism planet carrier 34 are fixedly connected to the mechanical transmission mechanism input shaft 41. The clutch $C_3$ 42 is used for connecting the front planetary gear mechanism sun gear 44 and the front planetary gear mechanism ring gear 48. The brake $B_2$ 43 is used for fixing the front planetary gear mechanism sun gear 44. The front planetary gear mechanism planet carrier 45 and the rear planetary gear mechanism planet carrier 47 are fixedly connected and can be fixed by the brake $B_1$ 46. The rear planetary gear mechanism ring gear 49 and the mechanical transmission mechanism output shaft 411 are fixedly connected and are connected to the power convergence mechanism 5.

The power convergence mechanism 5 includes a brake $B_3$ 51, a power convergence mechanism ring gear 52, a power convergence mechanism planet carrier 53, a power convergence mechanism sun gear 54, and a clutch $C_4$ 55. The power convergence mechanism ring gear 52 is fixedly connected to the mechanical transmission mechanism output shaft 411 and can be fixed by the brake $B_3$ 51. The power convergence mechanism planet carrier 53 is fixedly connected to the output shaft 6 and is connected to the power convergence mechanism ring gear 52 through the clutch $C_4$ 55. The power convergence mechanism sun gear 54 is connected to an output end of the hydraulic transmission mechanism 7.

The hydraulic transmission mechanism 7 includes a clutch $C_5$ 71, a hydraulic transmission input gear pair 72, a variable displacement pump 73, a hydraulic pipe 74, a quantitative motor 75, a hydraulic transmission output gear pair 76, and a clutch $C_6$ 77. Power is transmitted by the power split mechanism 3 to the variable displacement pump 73 through the hydraulic transmission input gear pair 72 and the clutch $C_5$ 71. The variable displacement pump 73 outputs fuel to the quantitative motor 75 through the hydraulic pipe 74 to drive the quantitative motor 75 to rotate. The power from the quantitative motor 75 is transmitted through the clutch $C_6$ 77, the hydraulic transmission output gear pair 76, and the power convergence mechanism 5 to the output shaft 6.

As shown in Table 1, transmission modes including hydraulic transmission, power-split hydro-mechanical transmission, power-convergence hydro-mechanical transmission, and mechanical transmission are provided between the engine and the output member by adjusting the displacement ratio of the hydraulic transmission mechanism 7 and selectively controlling engagement of the clutch assembly and the brake assembly.

Figure 2:
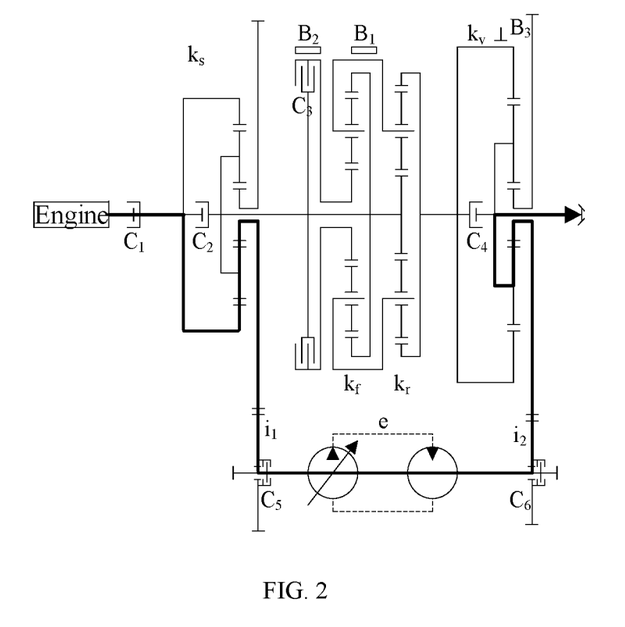
FIG. 2 is a schematic; diagram showing the power flow in an R(H) gear according to the present invention.

The hydraulic transmission includes an R(H) gear, an $F_1$(H) gear, and an $F_2$(H) gear, which are described in detail below:

The power flow in the R(H) gear is shown in FIG. 2. When the clutch $C_5$ 71, the clutch $C_6$ 77, the brake $B_1$ 46, and the brake $B_2$ 43 are engaged, the engine power transmitted after the main clutch $C_1$ 2 is engaged passes through the power split mechanism input shaft 31, the power split mechanism ring gear 33, the power split mechanism sun gear 35, the hydraulic transmission mechanism 7, the power convergence mechanism sun gear 54, and the power convergence mechanism planet carrier 53 and is output from the output shaft 6. In this case, the output speed and the input speed are in the following relationship:

$$n_o = -\frac{3.5e}{4.5}n_i$$

wherein $n_i$ is the input speed, $n_o$ is the output speed, and e is the displacement ratio of the hydraulic transmission mechanism.

Figure 3:
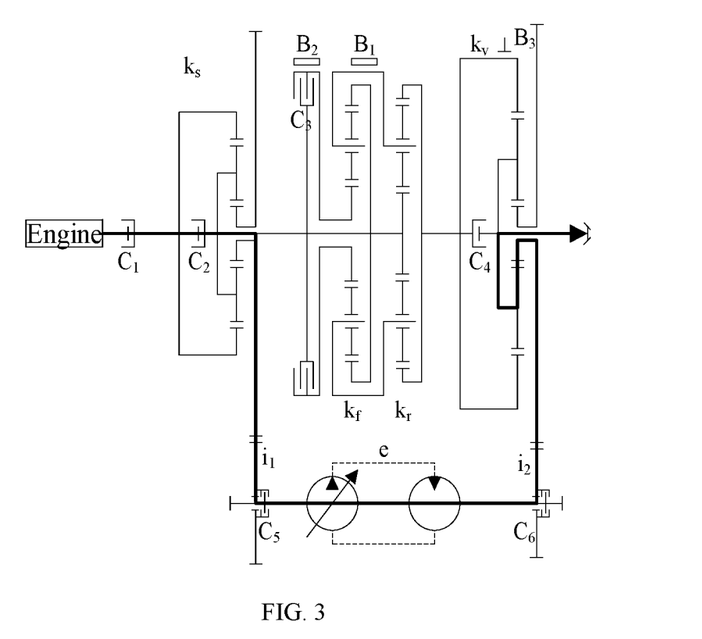
FIG. 3 is a schematic diagram showing the power flow in an $F_1(H)$ gear according to the present invention.

The power flow in the $F_1$(H) gear is shown in FIG. 3. When the clutch $C_2$ 32, the clutch $C_5$ 71, the clutch $C_6$ 77, and the brake $B_3$ 51 are engaged, the power split mechanism 3 is fixedly connected as a whole, and the engine power transmitted after the main clutch $C_1$ 2 is engaged passes through the power split mechanism 3, the hydraulic transmission mechanism 7, the power convergence mechanism sun gear 54, and the power convergence mechanism planet carrier 53 and is output from the output shaft 6. In this case, the output speed and the input speed are in the following relationship:

$$n_o = \frac{e}{4.5}n_i.$$

Figure 4:
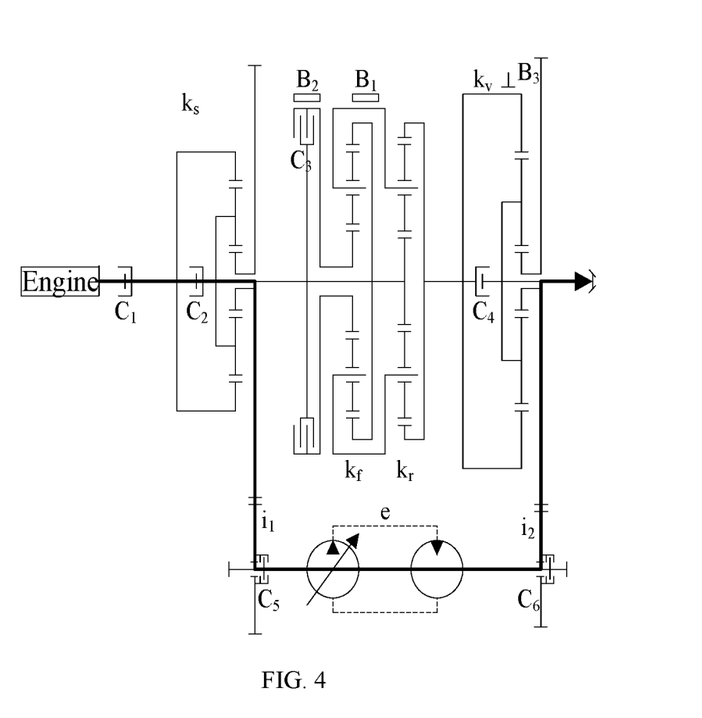
FIG. 4 is a schematic diagram showing the power flow in an $F_2(H)$ gear according to the present invention.

The power flow in the $F_2$(H) gear is shown in FIG. 4. When the clutch $C_2$ 32, the clutch $C_4$ 55, the clutch $C_5$ 71, and the clutch $C_6$ 77 are engaged, the power split mechanism 3 and the power convergence mechanism 5 are each fixedly connected as a whole, and the engine power transmitted after the main clutch $C_1$ 2 is engaged passes through the power split mechanism 3, the hydraulic transmission mechanism 7, and the power convergence mechanism 5 and is output from the output shaft 6. In this case, the output speed and the input speed are in the following relationship:

$$n_o = en_i.$$

Figure 5:
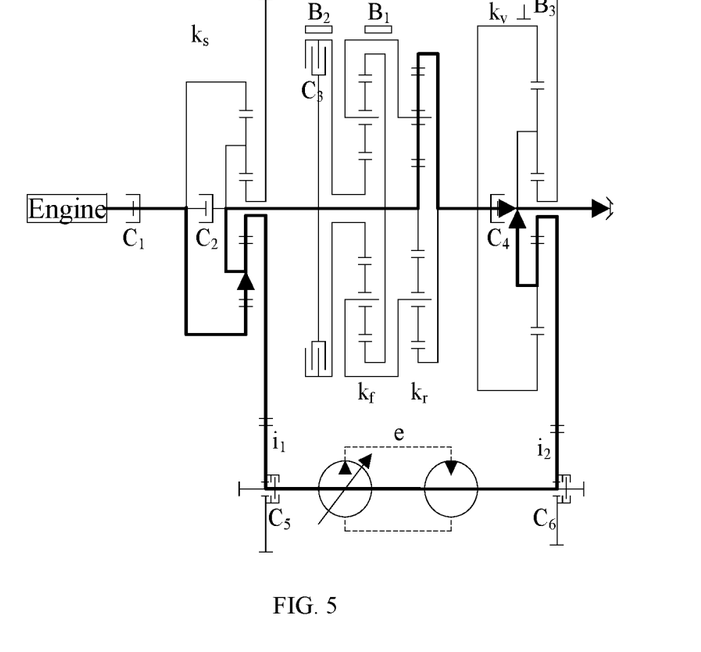
FIG. 5 is a schematic diagram showing the power flow in an R(HMs) gear according to the present invention.

The power-split hydro-mechanical transmission includes an R(HMs) gear, an $F_1$(HMs) gear, and an $F_2$(HMs) gear, which are described in detail below:

The power flow in the (HMs) gear is shown in FIG. 5. When the clutch $C_4$ 55, the clutch $C_5$ 71, the clutch $C_6$ 77, and the brake $B_1$ 46 are engaged, the engine power transmitted after the main clutch $C_1$ 2 is engaged passes through the power split mechanism input shaft 31 and the power split mechanism ring gear 33 and is split into two parts. One part of the power is transmitted through the power split mechanism sun gear 35 and the hydraulic transmission mechanism 7 to the power convergence mechanism sun gear 54. The other part of the power is transmitted through the power split mechanism planet carrier 34, the mechanical transmission mechanism input shaft 41, the mechanical transmission mechanism rear sun gear 410, the mechanical transmission mechanism rear ring gear 49, and the mechanical transmission mechanism output shaft 411 to the power convergence mechanism ring gear 52. Since the power convergence mechanism 5 is fixedly connected as a whole, the hydraulic power transmitted to the power convergence mechanism sun gear 54 and the mechanical power transmitted to the power convergence mechanism ring gear 52 pass through the power convergence mechanism 5 and are output from the output shaft 6. In this case, the output speed and the input speed are in the following relationship:

$$n_o = \frac{3.5}{-11.25 - \frac{1}{e}} n_i.$$

Figure 6:
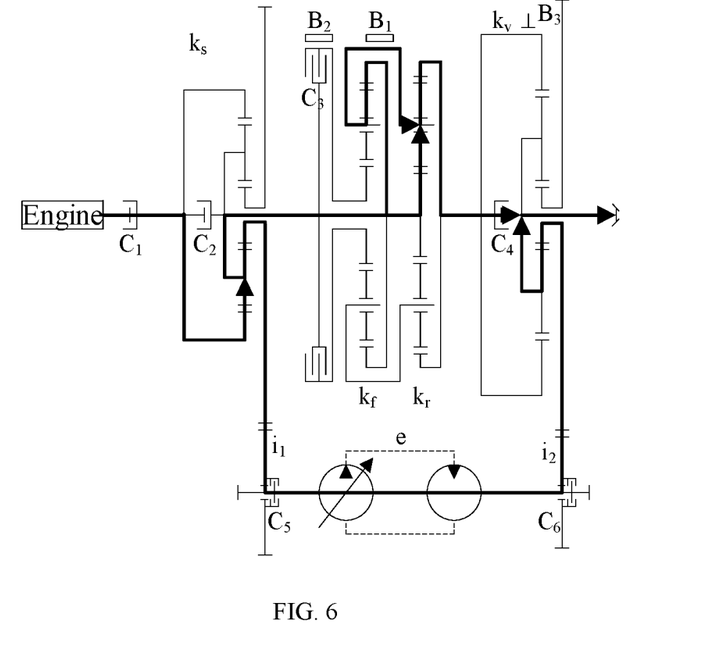
FIG. 6 is a schematic diagram showing the power flow in an $F_1$(HMs) gear according to the present invention.

The power flow in the $F_1$(HMs) gear is shown in FIG. 6. When the clutch $C_4$ 55, the clutch $C_5$ 71, the clutch $C_6$ 77, and the brake $B_2$ 43 are engaged, the engine power transmitted after the main clutch $C_1$ 2 is engaged passes through the power split mechanism input shaft 31 and the power split mechanism ring gear 33 and is split into two parts. One part of the power is transmitted through the power split mechanism sun gear 35 and the hydraulic transmission mechanism 7 to the power convergence mechanism sun gear 54. The other part of the power is transmitted through the power split mechanism planet carrier 34 to the mechanical transmission mechanism input shaft 41, and the mechanical power is split again. One part of the mechanical power is transmitted through the mechanical transmission mechanism front ring gear 48 and the mechanical transmission mechanism front planet carrier 45 to the mechanical transmission mechanism rear planet carrier 47. The other part of the mechanical power is directly transmitted to the mechanical transmission mechanism rear sun gear 410. The two parts of the mechanical power are converged at the mechanical transmission mechanism rear ring gear 49, and are then transmitted through the mechanical transmission mechanism output shaft 411 to the power convergence mechanism ring gear 52. Since the power convergence mechanism 5 is fixedly connected as a whole, the hydraulic power transmitted to the power convergence mechanism sun gear 54 and the mechanical power transmitted to the power convergence mechanism ring gear 52 pass through the power convergence mechanism 5 and are output from the output shaft 6. In this case, the output speed and the input speed are in the following relationship:

$$n_o = \frac{3.5}{9.0 - \frac{1}{e}} n_i.$$

Figure 7:
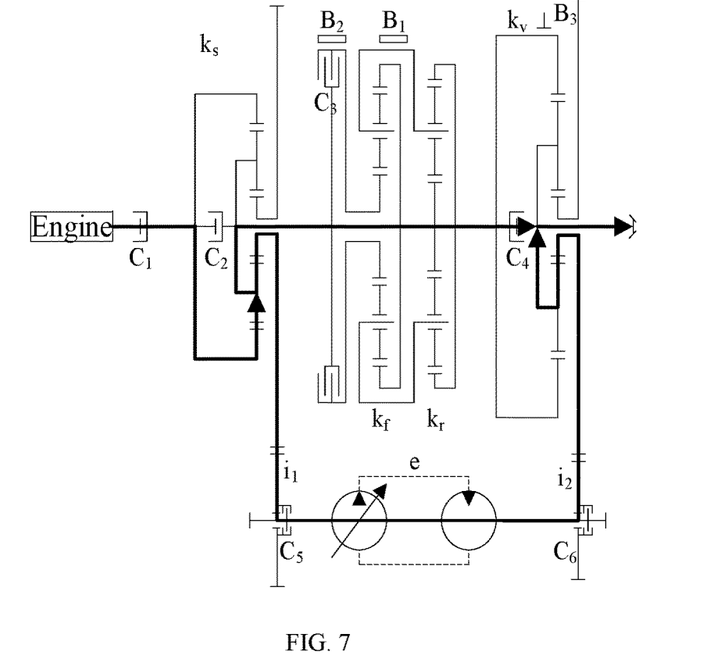
FIG. 7 is a schematic diagram showing the power flow in an $F_2$(HMs) gear according to the present invention.

The power flow in the $F_2$(HMs) gear is shown in FIG. 7. When the clutch $C_3$ 42, the clutch $C_4$ 55, the clutch $C_5$ 71, and the clutch $C_6$ 77 are engaged, the engine power transmitted after the main clutch $C_1$ 2 is engaged passes through the power split mechanism input shaft 31 and the power split mechanism ring gear 33 and is split into two parts. One part of the power is transmitted through the power split mechanism sun gear 35 and the hydraulic transmission mechanism 7 to the power convergence mechanism sun gear 54. The other part of the power is transmitted through the mechanical transmission mechanism 4 that is fixedly connected as a whole to the power convergence mechanism ring gear 52. Since the power convergence mechanism 5 is fixedly connected as a whole, the hydraulic power transmitted to the power convergence mechanism sun gear 54 and the mechanical power transmitted to the power convergence mechanism ring gear 52 pass through the power convergence mechanism 5 and are output from the output shaft 6. In this case, the output speed and the input speed are in the following relationship:

$$n_o = \frac{3.5}{4.5 - \frac{1}{e}} n_i.$$

Figure 8:
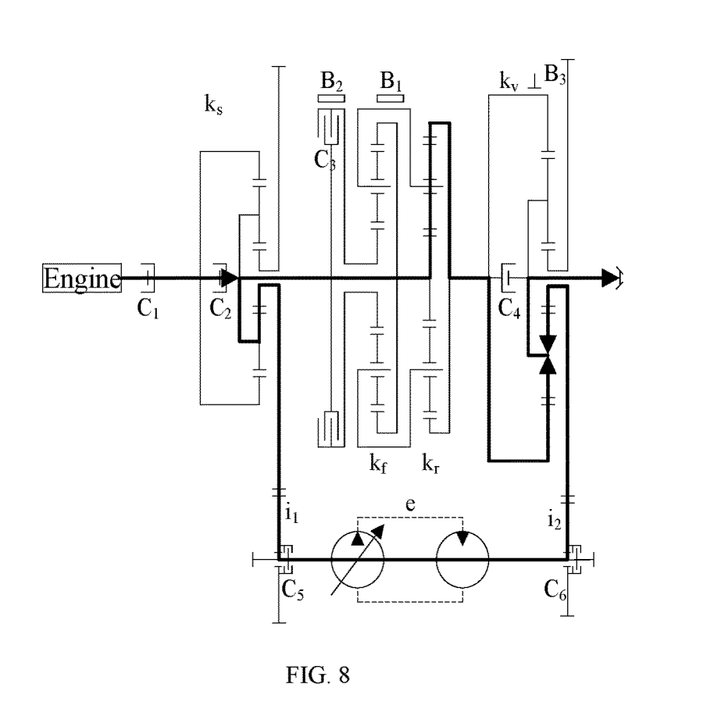
FIG. 8 is a schematic diagram showing the power flow in an R(HMv) gear according to the present invention.

The power-convergence hydro-mechanical transmission includes an R(HMv) gear, an $F_1$(HMv) gear, and an $F_2$(HMv) gear, which are described in detail below:

The power flow in the R(HMv) gear is shown in FIG. 8. When the clutch $C_2$ 32, the clutch $C_5$ 71, the clutch $C_6$ 77, and the brake $B_1$ 46 are engaged, the engine power transmitted after the main clutch $C_1$ 2 is engaged passes through the power split mechanism 3 that is fixedly connected as a whole and is split into two parts. One part of the power is transmitted through the hydraulic transmission mechanism 7 to the power convergence mechanism sun gear 54. The other part of the power is transmitted through the mechanical transmission mechanism input shaft 41, the mechanical transmission mechanism rear sun gear 410, the mechanical transmission mechanism rear ring gear 49, and the mechanical transmission mechanism output shaft 411 to the power convergence mechanism ring gear 52. The hydraulic power transmitted to the power convergence mechanism sun gear 54 and the mechanical power transmitted to the power convergence mechanism ring gear 52 pass through the power convergence mechanism planet carrier 53 and are output from the output shaft 6. In this case, the output speed and the input speed are in the following relationship:

$$n_o = \frac{-1.4 + e}{4.5} n_i.$$

Figure 9:
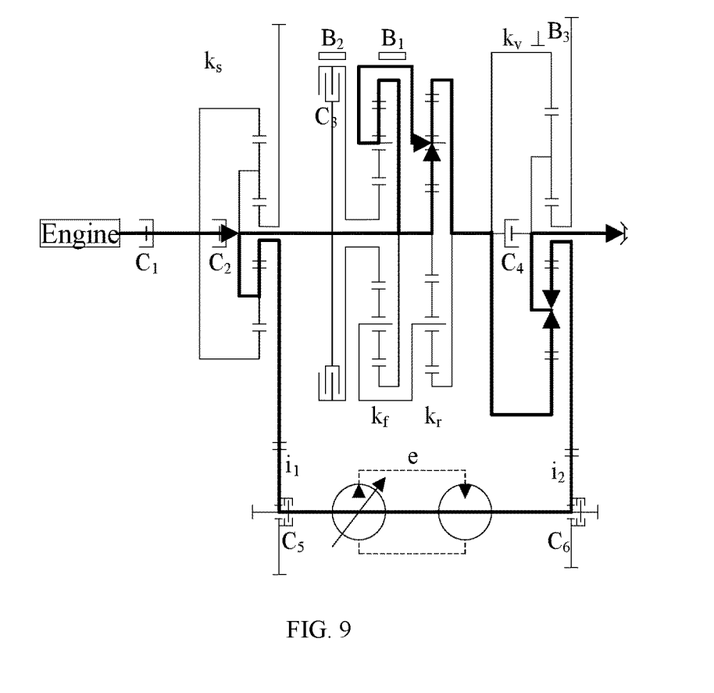
FIG. 9 is a schematic diagram showing the power flow in an $F_1$(HMv) gear according to the present invention.

The power flow in the $F_1$(HMv) gear is shown in FIG. 9. When the clutch $C_2$ 32, the clutch $C_5$ 71, the clutch $C_6$ 77, and the brake $B_2$ 43 are engaged, the engine power transmitted after the main clutch $C_1$ 2 is engaged passes through the power split mechanism 3 that is fixedly connected as a whole and is split into two parts. One part of the power is transmitted through the hydraulic transmission mechanism 7 to the power convergence mechanism sun gear 54. The other part of the power is transmitted to the mechanical transmission mechanism input shaft 41, and the mechanical power is split again. One part of the mechanical power is transmitted through the mechanical transmission mechanism front ring gear 48 and the mechanical transmission mechanism front planet carrier 45 to the mechanical transmission mechanism rear planet carrier 47. The other part of the mechanical power is directly transmitted to the mechanical transmission mechanism rear sun gear 410. The two parts of the mechanical power are converged at the mechanical transmission mechanism rear ring gear 49, and are then transmitted through the mechanical transmission mechanism output shaft 411 to the power convergence mechanism ring gear 52. The hydraulic power transmitted to the power convergence mechanism sun gear 54 and the mechanical power transmitted to the power convergence mechanism ring gear 52 are converged at the power convergence mechanism planet carrier 53 and are output from the output shaft 6. In this case, the output speed and the input speed are in the following relationship:

$$n_o = \frac{1.75 + e}{4.5} n_i.$$

Figure 10:
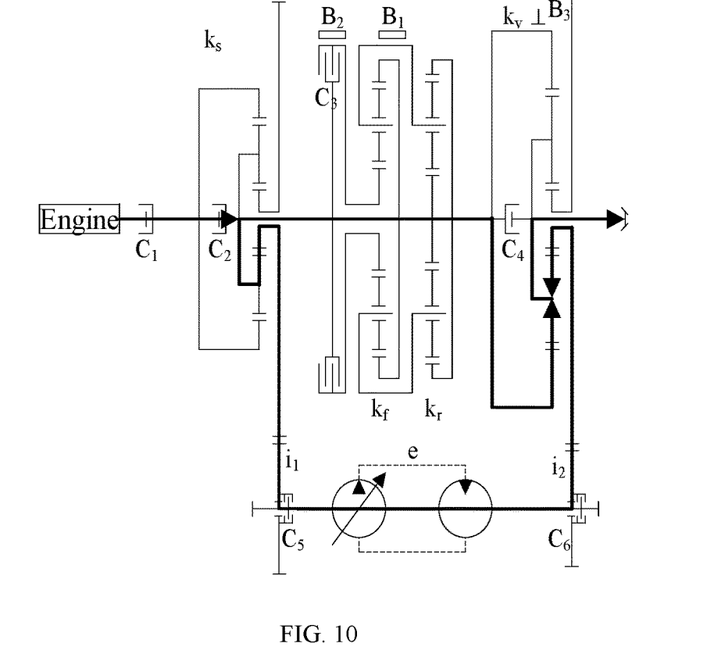
FIG. 10 is a schematic diagram showing the power flow in an $F_2$(HMv) gear according to the present invention.

The power flow in the $F_2$(HMv) gear is shown in FIG. 10. When the clutch $C_2$ 32, the clutch $C_3$ 42, the clutch $C_5$ 71, and the clutch $C_6$ 77 are engaged, the engine power transmitted after the main clutch $C_1$ 2 is engaged passes through the power split mechanism 3 that is fixedly connected as a whole and is split into two parts. One part of the power is transmitted through the hydraulic transmission mechanism 7 to the power convergence mechanism sun gear 54. The other part of the power is transmitted through the mechanical transmission mechanism 4 that is fixedly connected as a whole to the power convergence mechanism ring gear 52. The hydraulic power transmitted to the power convergence mechanism sun gear 54 and the mechanical power transmitted to the power convergence mechanism ring gear 52 are converged at the power convergence mechanism planet carrier 53 and are output from the output shaft 6. In this case, the output speed and the input speed are in the following relationship:

$$n_o = \frac{3.5 + e}{4.5} n_i.$$

Figure 11:
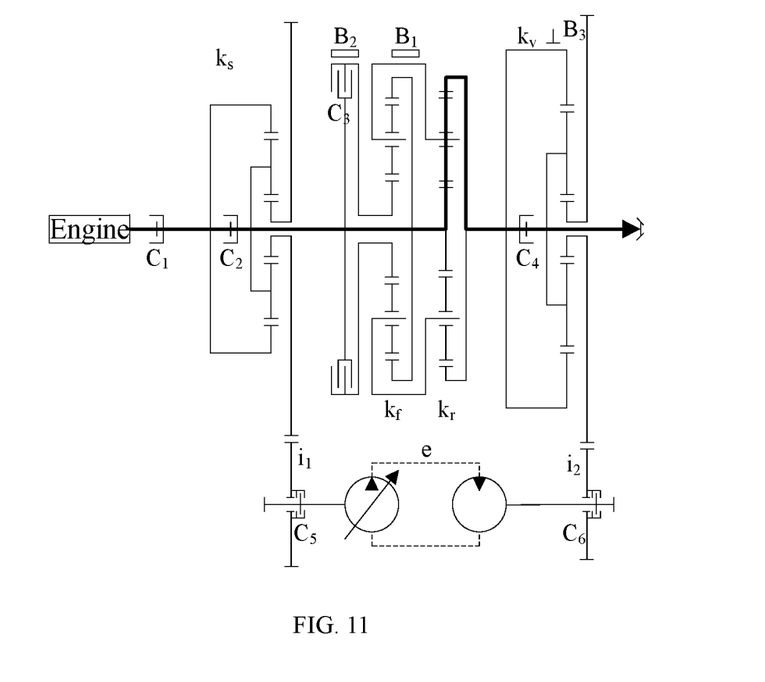
FIG. 11 is a schematic diagram showing the power flow in an R(M) gear according to the present invention.

The mechanical transmission includes an R(M) gear, an $F_1$(M) gear, and an $F_2$(M) gear, which are described in detail below:

The power flow in the R(M) gear is shown in FIG. 11, When the clutch $C_2$ 32, the clutch $C_4$ 55, and the brake $B_1$ 46 are engaged, the power split mechanism 3 and the power convergence mechanism 5 are each fixedly connected as a whole, and the engine power transmitted after the main clutch $C_1$ 2 is engaged passes through the power split mechanism 3, the mechanical transmission mechanism input shaft 41, the mechanical transmission mechanism rear sun gear 410, the mechanical transmission mechanism rear ring gear 49, the mechanical transmission mechanism output shaft 411, and the power convergence mechanism 5 and is output from the output shaft 6. In this case, the output speed and the input speed are in the following relationship:

$$n_o = -0.4 n_i.$$

Figure 12:
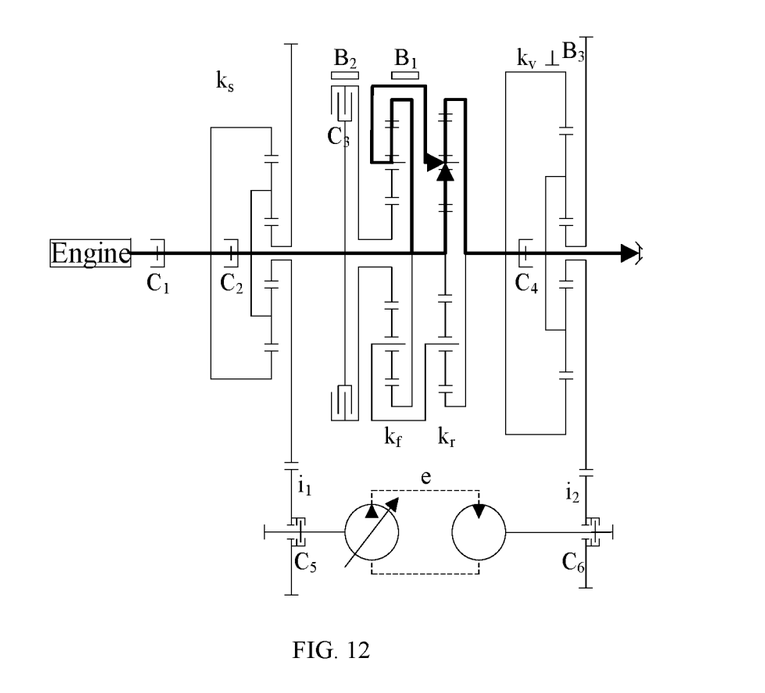
FIG. 12 is a schematic diagram showing the power flow in an $F_1$(M) gear according to the present invention.

The power flow in the $F_1$(M) gear is shown in FIG. 12, When the clutch $C_2$ 32, the clutch $C_4$ 55, and the brake $B_2$ 43 are engaged, the power split mechanism 3 and the power convergence mechanism 5 are each fixedly connected as a whole, and the engine power transmitted after the main clutch $C_1$ 2 is engaged passes through the power split mechanism 3 and the mechanical transmission mechanism input shaft 41 and is then split. One part of the power is directly transmitted to the mechanical transmission mechanism rear sun gear 410. The other part of the power is transmitted through the mechanical transmission mechanism front ring gear 48 and the mechanical transmission mechanism front planet carrier 45 to the mechanical transmission mechanism rear planet carrier 47. The two parts of the mechanical power are converged at the mechanical transmission mechanism rear ring gear 49, then pass through the mechanical transmission mechanism output shaft 411 and the power convergence mechanism 5, and are output from the output shaft 6. In this case, the output speed and the input speed are in the following relationship:

$$n_o = 0.5 n_i.$$

Figure 13:
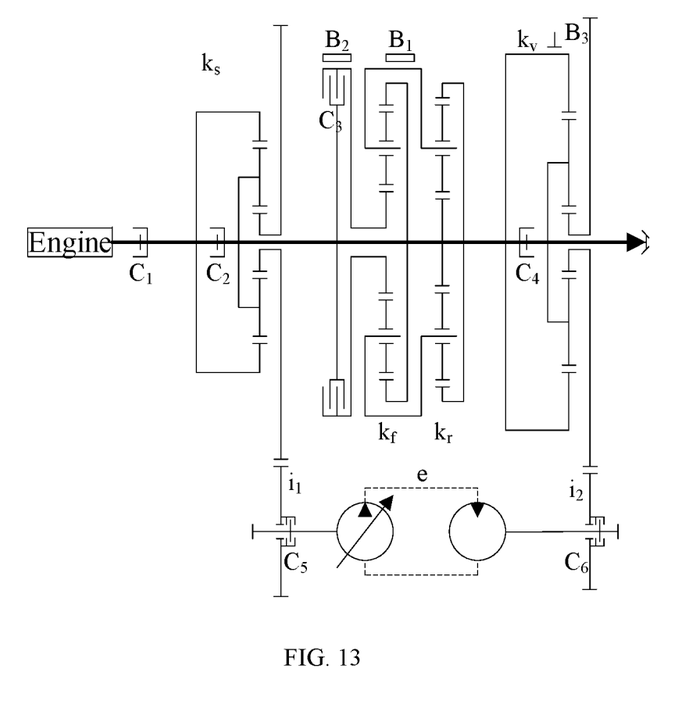
FIG. 13 is a schematic diagram showing the power flow in an $F_2$(M) gear according to the present invention.

The power flow in the $F_2$(M) gear is shown in FIG. 13, When the clutch $C_2$ 32, the clutch $C_3$ 42, and the clutch $C_4$ 55 are engaged, the power split mechanism 3, the mechanical transmission mechanism 4, and the power convergence mechanism 5 are each fixedly connected as a whole, and the engine power transmitted after the main clutch $C_1$ 2 is engaged passes through the power split mechanism 3, the mechanical transmission mechanism 4, and the power convergence mechanism 5 and is output from the output shaft 6. In this case, the output speed and the input speed are in the following relationship:

$$n_o = n_i.$$

TABLE 1

| | | Engagement/disengagement of each component | | | | | | | | | |
|---|---|---|---|---|---|---|---|---|---|---|---|
| Gear | Transmission mode | Gear-shift execution component | | | | | | | | | Relationship between rotation speeds of the output shaft and the input shaft |
| | | $B_1$ | $B_2$ | $B_3$ | $C_1$ | $C_2$ | $C_3$ | $C_4$ | $C_5$ | $C_6$ | |
| R(H) | Hydraulic transmission | ▲ | ▲ | | ▲ | | | | ▲ | ▲ | $n_o = -\dfrac{ek_s}{(k_v + 1)i_1 i_2} n_I$ |
| $F_1$(H) | | | | | ▲ | ▲ | ▲ | | ▲ | ▲ | $n_o = \dfrac{e}{(k_v + 1)i_1 i_2} n_I$ |

TABLE 1-continued

Engagement/disengagement of each component

| Gear | Transmission mode | Gear-shift execution component | | | | | | | | | Relationship between rotation speeds of the output shaft and the input shaft |
|---|---|---|---|---|---|---|---|---|---|---|---|
| | | $B_1$ | $B_2$ | $B_3$ | $C_1$ | $C_2$ | $C_3$ | $C_4$ | $C_5$ | $C_6$ | |
| $F_2$(H) | | | | | ▲ | ▲ | | ▲ | ▲ | ▲ | $n_o = \dfrac{e}{i_1 i_2} n_I$ |
| R(HMs) | Power-split hydromechanical transmission | ▲ | | | ▲ | | | ▲ | ▲ | ▲ | $n_o = \dfrac{k_s}{-k_r(k_s+1) - \dfrac{i_1 i_2}{e}} n_I$ |
| $F_1$(HMs) | | | ▲ | | ▲ | | | ▲ | ▲ | ▲ | $n_o = \dfrac{k_s}{\dfrac{k_r(k_f+1)(k_s+1)}{k_f k_r - 1} - \dfrac{i_1 i_2}{e}} n_I$ |
| $F_2$(HMs) | | | | | ▲ | | ▲ | ▲ | ▲ | ▲ | $n_o = \dfrac{k_s}{k_s + 1 - \dfrac{i_1 i_2}{e}} n_I$ |
| R(HMv) | Power-convergence hydromechanical transmission | ▲ | | | ▲ | ▲ | | | ▲ | ▲ | $n_o = \dfrac{-\dfrac{k_v}{k_r} + \dfrac{e}{i_1 i_2}}{k_v + 1} n_I$ |
| $F_1$(HMv) | | | ▲ | | ▲ | ▲ | | | ▲ | ▲ | $n_o = \dfrac{\dfrac{k_v(k_f k_r - 1)}{k_r(k_f+1)} + \dfrac{e}{i_1 i_2}}{k_v + 1} n_I$ |
| $F_2$(HMv) | | | | | ▲ | ▲ | ▲ | | ▲ | ▲ | $n_o = \dfrac{k_v + \dfrac{e}{i_1 i_2}}{k_v + 1} n_I$ |
| R(M) | Mechanical transmission | ▲ | | | ▲ | ▲ | ▲ | | | | $n_o = -\dfrac{1}{k_r} n_I$ |
| $F_1$(M) | | | ▲ | | ▲ | ▲ | ▲ | | | | $n_o = \dfrac{k_f k_r - 1}{(k_f+1)k_r} n_I$ |
| $F_2$(M) | | | | | ▲ | ▲ | ▲ | ▲ | | | $n_o = n_I$ |

Note:
▲ stands for engagement of a component;

the main parameters are: $n_o$ is the rotation speed of the output shaft, $n_e$ is the engine speed, e is the displacement ratio of the hydraulic transmission mechanism, i is the transmission ratio of a related gear, $k_s$ is the characteristic parameter of the power split planetary gear, $k_v$ is the characteristic parameter of the power convergence planetary gear, $k_f$ is the characteristic parameter of the front planetary gear mechanism, $k_r$ is the characteristic parameter of the rear planetary gear mechanism; $i_1 i_2$=1.0, $k_s$=3.5, $k_v$=3.5, $k_f$=1.8, $k_r$=2.5.

F stands for forward direction, R stands for reverse direction, H stands for hydraulic transmission, M stands for mechanical transmission, HM stands for hydro-mechanical transmission, HMs stands for power-split hydro-mechanical transmission, and HM stands for power-convergence hydro-mechanical transmission.

The characteristic curves of speed regulation of the present invention are shown in FIGS. 14A-14D. When e∈(0 1.00), the speed regulation range in the R(H) gear is $n_o$∈(−0.78, 0)$n_I$, the speed regulation range in the $F_1$(H) gear is $n_o$∈(0, 0.22)$n_I$, and the speed regulation range in the $F_2$(H) gear is $n_o$∈(0, 1.00)$n_I$; when e∈(0, 1.00), the speed regulation range in the R(HMs) gear is $n_o$∈(−0.29, 0)$n_I$; when e∈(0.25, 1.00), the speed regulation range in the $F_1$(HMs) gear is $n_o$∈(0.44, 0.70)$n_I$ and the speed regulation range in the $F_2$(HMs) gear is $n_o$∈(1.00, 7.00)$n_I$; when e∈(0, 1.00), the speed regulation range in the R(HMs) gear is $n_o$∈(−0.31, −0.09)$n_I$, the speed regulation range in the $F_1$(HMs) gear is $n_o$∈(0.39, 0.61)$n_I$, and the speed regulation range in the $F_2$(HMs) gear is $n_o$∈(0.78, 1.00)$n_I$; the speed regulation values in R(M), $F_1$(M), and $F_2$(M) are $n_o$=−0.4$n_I$, $n_o$=0.5$n_I$, and $n_o$=$n_I$, respectively.

Figure 14A:
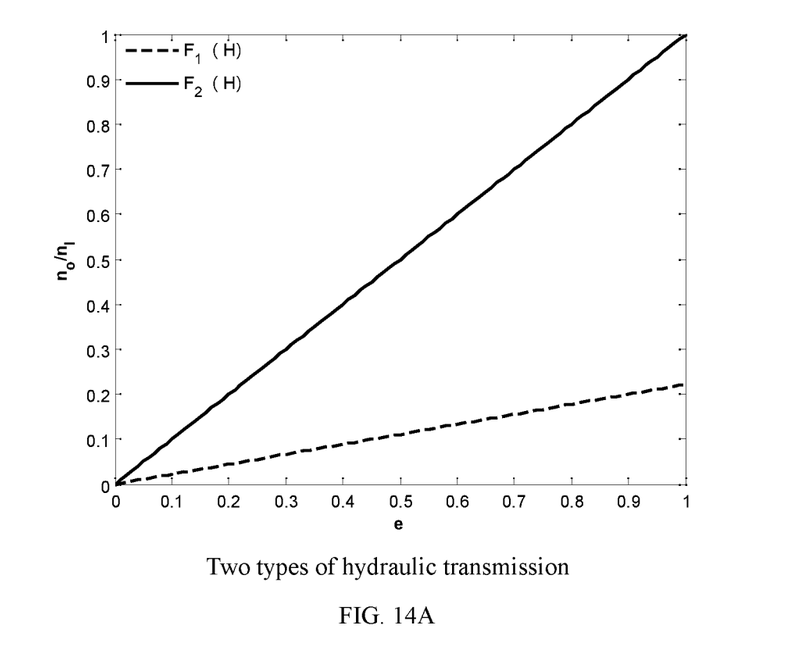
FIGS. 14A-14D show characteristic curves of speed regulation according to the present invention.
Figure 14B:
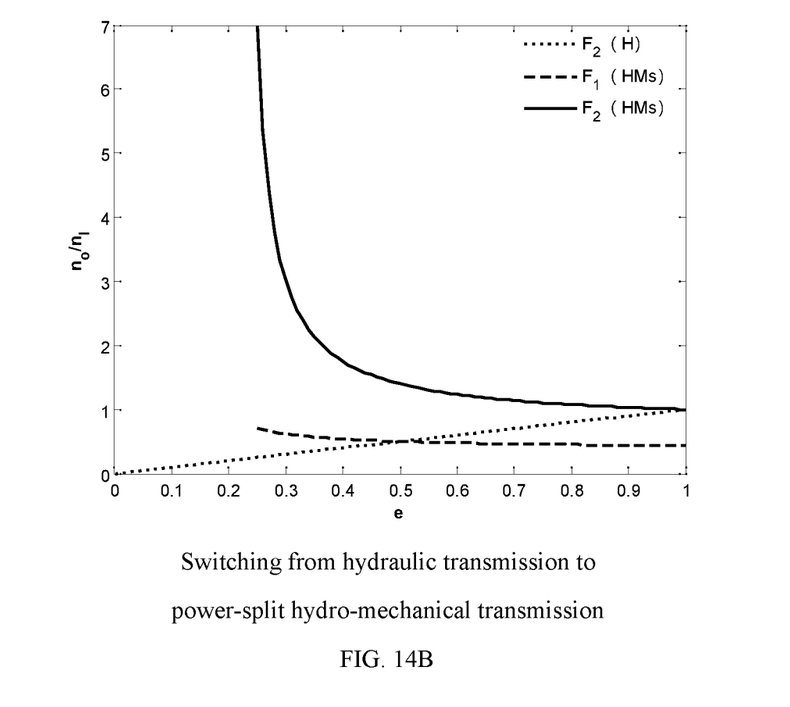
Figure 14C:
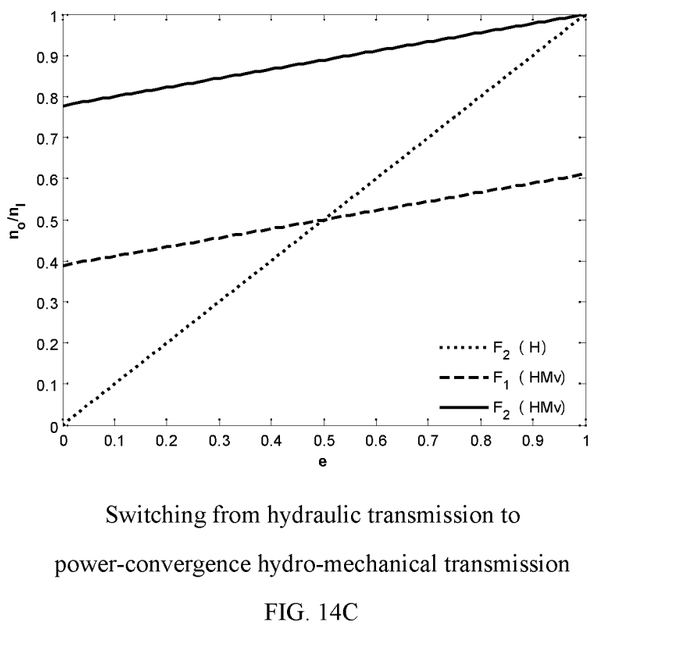
Figure 14D:
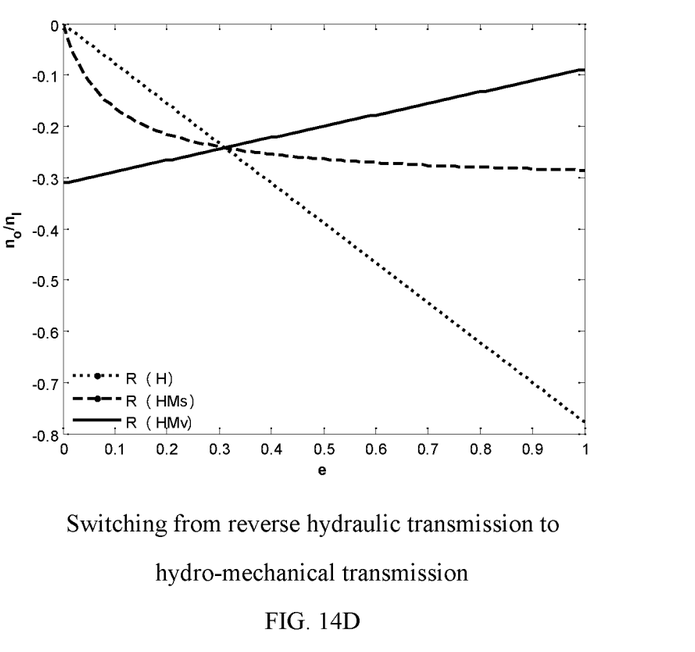

Two hydraulic startup modes are shown in FIG. 14A. When e=0.50, the $F_2$(H) gear can be shifted without power interruption to the $F_1$(HMs) gear; when e=1.00 the $F_2$(H) gear can be shifted without power interruption to the $F_2$(HMs)) gear, and in this case, nonlinear speed regulation is implemented, which is shown in FIG. 14B. When e=0.50, the $F_2$(H) gear can be shifted without power interruption to the $F_1$(HMv) gear; when e=1,00, the $F_2$(H) gear can be shifted without power interruption to the $F_2$(HMv) gear, and in this case, linear speed regulation is implemented, which is shown in FIG. 14C. When e=0.31, the R(H) gear can be shifted without power interruption to the R(HMs) gear or R(HMv) gear, which is shown in FIG. 14D.

Further analysis shows that. $F_2$(H), $F_1$(HMs), and $F_1$(HMv) can be shifted without power interruption at e=0.50, and $F_2$(H), $F_2$(HMs), and $F_2$(HMv) can be shifted without power interruption at e=1.00, that is, stepless speed regulation can be implemented among the above gears.

During forward transmission of the transmission device, two forward gears are adopted in the hydraulic transmission, the $F_1(H)$ gear that mainly features low speed and high torque satisfies working conditions with high power requirements, and the $F_2(H)$ gear can not only be shifted to the $F_1(HMs)$ gear and the $F_2(HMs)$ gear in the power-split hydro-mechanical transmission, but also be shifted to the $F_1(HMv)$ gear and the $F_2(HMv)$ gear in the power-convergence hydro-mechanical transmission to implement stepless speed regulation. Stepless speed regulation can be implemented among the $F_2(H)$ gear, the $F_2(HMs)$ gear, the $F_2(HMs)$ gear, the $F_1(HMv)$ gear, and the $F_2(HMv)$ gear by adjusting the transmission ratio of the hydraulic transmission mechanism 7 and selectively controlling engagement of the clutch $C_1$ 2, the clutch $C_2$ 32, the clutch $C_3$ 42, the clutch $C_4$ 55, the clutch $C_5$ 71 the clutch $C_6$ 77 the brake $B_1$ 46, and the brake $B_2$ 43.

During forward transmission of the transmission device, the R(H) gear is adopted in the hydraulic transmission and is shifted to the R(HMs) gear in the power-split hydro-mechanical transmission and the R(HMv) gear in the power-convergence hydro-mechanical transmission to implement stepless speed regulation. Stepless speed regulation can be implemented among the R(H) gear, the R(HMs) gear, and the R(HMv) gear by adjusting the transmission ratio of the hydraulic transmission mechanism 7 and selectively controlling engagement of the clutch $C_1$ 2, the clutch $C_2$ 32, the clutch $C_3$ 42, the clutch $C_4$ 55, the clutch $C_5$ 71, the clutch $C_6$ 77, the brake $B_1$ 46, and the brake $B_2$ 43.

The above descriptions are preferred embodiments of the present invention, and are not intended to limit the present invention. Any obvious improvements, replacements, or modifications made by persons skilled in the art without departing from the essence of the present invention shall fall within the protection scope of the present invention.

What is claimed is:

1. A power split and power convergence combined hydro-mechanical hybrid transmission device, comprising an input member, a power split mechanism, a mechanical transmission mechanism, a power convergence mechanism, an output member, a hydraulic transmission mechanism, a clutch assembly, and a brake assembly, wherein the input member is connected to the power split mechanism, the power convergence mechanism is connected to the output member, and the clutch assembly connects an output end of the power split mechanisms to an input end of the mechanical transmission mechanism and an input end of the hydraulic transmission mechanism and connects an input end of the power convergence mechanism to an output end of the mechanical transmission mechanism and an output end of the hydraulic transmission mechanism; the clutch assembly and the brake assembly provide a continuous transmission ratio between the input member and the output member;

wherein transmission modes comprising hydraulic transmission, power-split hydro-mechanical transmission, power-convergence hydro-mechanical transmission, and mechanical transmission are provided between the input member and the output member by adjusting a displacement ratio of the hydraulic transmission mechanism and selectively controlling engagement of the clutch assembly and the brake assembly;

the mechanical transmission mechanism comprises a mechanical transmission mechanism input shaft, a front planetary gear mechanism, and a rear planetary gear mechanism, wherein a sun gear of the rear planetary gear mechanism and a ring gear of the front planetary gear mechanism are both connected to the mechanical transmission mechanism input shaft; a planet carrier of the front planetary gear mechanism is connected to a planet carrier of the rear planetary gear mechanism;

the power split mechanism comprises a power split planetary gear mechanism, wherein a ring gear of the power split planetary gear mechanism is connected to the input member, a sun gear of the power split planetary gear mechanism is connected to the input end of the hydraulic transmission mechanism, and a planet carrier of the power split planetary gear mechanism is connected to the mechanical transmission mechanism input shaft; and the power convergence mechanism comprises a power convergence planetary gear mechanism, wherein a ring gear of the rear planetary gear mechanism is connected to a ring gear of the power convergence planetary gear mechanism, a planet carrier of the power convergence planetary gear mechanism is connected to the output member, and a sun gear of the power convergence planetary gear mechanism is connected to the output end of the hydraulic transmission mechanism.

2. The power split and power convergence combined hydro-mechanical hybrid transmission device according to claim 1, wherein the clutch assembly comprises a clutch $C_2$, a clutch $C_4$, a clutch $C_5$, and a clutch $C_6$, wherein
the clutch $C_2$ selectively connects the ring gear of the power split planetary gear mechanism to the planet carrier of the power split planetary gear mechanism to achieve synchronous rotation;
the clutch $C_4$ selectively connects the ring gear of the power convergence planetary gear mechanism to the planet carrier of the power convergence planetary gear mechanism to achieve synchronous rotation;
the clutch $C_5$ selectively connects the sun gear of the power split planetary gear mechanism to the input end of the hydraulic transmission mechanism to achieve synchronous rotation; and
the clutch $C_6$ selectively connects the output end of the hydraulic transmission mechanism to the sun gear of the power convergence planetary gear mechanism to achieve synchronous rotation;

the brake assembly comprises a brake $B_1$, a brake $B_2$, and a brake $B_3$, wherein
the brake $B_1$ is used for selectively connecting the planet carrier of the front planetary gear mechanism to a fixed member;
the brake $B_2$ is used for selectively connecting a sun gear of the front planetary gear mechanism to a fixed member; and
the brake $B_3$ is used for selectively connecting the ring gear of the power convergence planetary gear mechanism to a fixed member; and continuous forward or reverse hydraulic transmission is provided between the input member and the output member by adjusting the displacement ratio of the hydraulic transmission mechanism and selectively controlling engagement of the clutch $C_2$, the clutch $C_4$, the clutch $C_5$, the clutch $C_6$, the brake $B_1$, the brake $B_2$, and the brake $B_3$.

3. The power split and power convergence combined hydro-mechanical hybrid transmission device according to claim 2, wherein the clutch $C_5$, the clutch $C_6$, the brake $B_1$, and the brake $B_2$ are engaged to provide reverse hydraulic transmission between the input member and the output member; and the clutch $C_5$, the clutch $C_6$, the clutch $C_2$, and the brake $B_3$ are engaged and the clutch $C_5$, the clutch $C_6$, the clutch $C_2$, and the clutch $C_4$ are engaged to provide different forward hydraulic transmissions between the input member and the output member.

4. The power split and power convergence combined hydro-mechanical hybrid transmission device according to claim 2, wherein the clutch assembly further comprises a clutch $C_3$, wherein the clutch $C_3$ selectively connects the ring gear of the front planetary gear mechanism to the sun gear of the front planetary gear mechanism to achieve synchronous rotation;

the clutch $C_4$, the clutch $C_5$, the clutch $C_6$, and the brake $B_1$ are engaged to provide reverse power-split hydro-mechanical transmission between the input member and the output member; and the clutch $C_4$, the clutch $C_5$, the clutch $C_6$, and the brake $B_2$ are engaged and the clutch $C_3$, the clutch $C_4$, the clutch $C_5$, and the clutch $C_6$ are engaged to provide different forward power-split hydro-mechanical transmissions between the input member and the output member.

5. The power split and power convergence combined hydro-mechanical hybrid transmission device according to claim 4, wherein the clutch $C_2$, the clutch $C_5$, the clutch $C_6$, and the brake $B_1$ are engaged to provide reverse power-convergence hydro-mechanical transmission between the input member and the output member; and the clutch $C_2$, the clutch $C_5$, the clutch $C_6$, and the brake $B_2$ are engaged and the clutch $C_2$, the clutch $C_3$, the clutch $C_5$, and the clutch $C_6$ are engaged to provide different forward power-convergence hydro-mechanical transmissions between the input member and the output member.

6. The power split and power convergence combined hydro-mechanical hybrid transmission device according to claim 4, wherein the clutch $C_2$, the clutch $C_4$, and the brake $B_1$ are engaged to provide reverse mechanical transmission between the input member and the output member; and the clutch $C_2$, the clutch $C_4$, and the brake $B_2$ are engaged and the clutch $C_2$, the clutch $C_3$, and the clutch $C_4$ are engaged to provide different forward mechanical transmissions between the input member and the output member.

7. The power split and power convergence combined hydro-mechanical hybrid transmission device according to claim 4, wherein stepless speed regulation between forward hydraulic transmission and forward power-split hydro-mechanical transmission and stepless speed regulation between forward hydraulic transmission and forward power-convergence hydro-mechanical transmission are provided by adjusting the displacement ratio of the hydraulic transmission mechanism and selectively controlling engagement of the clutch $C_1$, the clutch $C_2$, the clutch $C_3$, the clutch $C_4$, the clutch $C_5$, the clutch $C_6$, the brake $B_1$, and the brake $B_2$.

8. The power split and power convergence combined hydro-mechanical hybrid transmission device according to claim 4, wherein stepless speed regulation between reverse hydraulic transmission and reverse power-split hydro-mechanical transmission and stepless speed regulation between reverse hydraulic transmission and reverse power-convergence hydro-mechanical transmission are provided by adjusting the displacement ratio of the hydraulic transmission mechanism and selectively controlling engagement of the clutch $C_1$, the clutch $C_2$, the clutch $C_3$, the clutch $C_4$, the clutch $C_3$, the clutch $C_6$, the brake $B_1$, and the brake $B_2$.

* * * * *